United States Patent
Samy

(10) Patent No.: US 9,749,015 B2
(45) Date of Patent: Aug. 29, 2017

(54) METHOD AND SYSTEM FOR TRANSMITTING VIDEO DATA OVER A POWERLINE COMMUNICATIONS TRANSMISSION CHANNEL

(71) Applicant: SAGEMCOM BROADBAND SAS, Rueil-Malmaison (FR)

(72) Inventor: Roger Samy, Rueil-Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 264 days.

(21) Appl. No.: 14/443,146

(22) PCT Filed: Nov. 15, 2013

(86) PCT No.: PCT/EP2013/073927
§ 371 (c)(1),
(2) Date: May 28, 2015

(87) PCT Pub. No.: WO2014/076230
PCT Pub. Date: May 22, 2014

(65) Prior Publication Data
US 2015/0341083 A1    Nov. 26, 2015

(30) Foreign Application Priority Data
Nov. 16, 2012 (FR) ...................... 12 60899

(51) Int. Cl.
*H04N 7/12* (2006.01)
*H04B 3/54* (2006.01)
(Continued)

(52) U.S. Cl.
CPC .......... *H04B 3/542* (2013.01); *H04N 19/103* (2014.11); *H04N 19/164* (2014.11); *H04N 19/63* (2014.11);
(Continued)

(58) Field of Classification Search
CPC .......... H04B 3/542; H04B 2203/5416; H04B 2203/545; H04N 19/164; H04N 19/63; H04N 19/103
(Continued)

(56) References Cited

FOREIGN PATENT DOCUMENTS

GB    2 393 370 A    3/2004
WO    2007/008680 A2    1/2007

OTHER PUBLICATIONS

Lee et al; "Three-Dimensional DCT/WT Compression Using Motion Vector Segmentation for Low Bit-Rate Video Coding;" IEEE Comput. Soc.; vol. 3; Oct. 26, 1997; pp. 456-459; XP010253805.

(Continued)

*Primary Examiner* — Mohammed Rahaman
*Assistant Examiner* — Richard Carter
(74) *Attorney, Agent, or Firm* — Oliff PLC; R. Brian Drozd

(57) ABSTRACT

For transmitting video data over a powerline communications transmission channel, a first communication device: obtains video data in the form of a succession of uncompressed images; determines the capacity of the transmission channel; performs a wavelet-decomposition of each uncompressed image, thereby obtaining data having different resolutions; compresses each wavelet-decomposed image, on the basis of the determined capacity of the powerline communications transmission channel; and performs transmission in pulse form with spreading of each compressed image to a second communication device, to introduce data redundancy, the rate of which, for each data item of said compressed image, is defined on the basis of the resolution of said video data item, the redundancy of the data having the lowest resolution being higher than the one of the data having any other resolution. The first communication device (Continued)

Figure 1A:
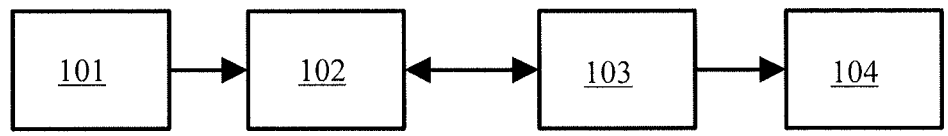

also transmits speed maps enabling the second communication device to thereby apply an image enhancement operation.

15 Claims, 5 Drawing Sheets

(51) Int. Cl.
    *H04N 19/63*     (2014.01)
    *H04N 19/103*     (2014.01)
    *H04N 19/164*     (2014.01)

(52) U.S. Cl.
    CPC .................. *H04B 2203/545* (2013.01); *H04B 2203/5416* (2013.01)

(58) Field of Classification Search
    USPC .............................. 375/240.19, 130; 382/240
    See application file for complete search history.

(56) References Cited

OTHER PUBLICATIONS

Zhang et al; "Motion-Compensated Wavelet Transform Coding for Color Video Compression;" IEEE Transactions on Circuits and Systems for Video Technology; vol. 2; No. 3; Sep. 1, 1992; pp. 285-296; XP000299259.
Secker et al; "Motion-Compensated Highly Scalable Video Compression Using an Adaptive 3D Wavelet Transform Based on Lifting;" International Conference on Image Processing; IEEE; Oct. 7, 2001; pp. 1029-1032; XP032396296.
Mar. 17, 2014 Search Report issued in International Application No. PCT/EP2013/073927.

METHOD AND SYSTEM FOR TRANSMITTING VIDEO DATA OVER A POWERLINE COMMUNICATIONS TRANSMISSION CHANNEL

The present invention relates to transmitting video data over a powerline communications transmission channel.

Audiovisual systems installed in particular in residential premises are typically based on one or more audiovisual content source devices and one or more audiovisual content receiver devices. Such source devices are for example Blu-Ray (registered trademark) players or set-top boxes. Such receiving devices are for example high-definition televisions (HDTVs) or hard disk drives. To enable audiovisual contents to be transferred and to enable real-time decoding of these audiovisual contents, the source devices are typically connected to the receiving devices by dedicated cables, for example of the HDMI (High-Definition Multimedia Interface) type. This leads to more and more cables for these audiovisual systems, which raises problems of space and complexity of installation.

A first approach for eliminating these cables is to use a wireless link between the source devices and the receiver devices. So as to transfer high-definition audiovisual contents, WirelessHD (registered trademark) technology has been developed. This technology is based on data transmissions in a frequency band around 60 GHz and enables obtaining theoretical bit rates around 4 Gbps over distances around 10 meters. Such a distance is certainly sufficient for using audiovisual systems, but the use of such a frequency band has the drawback of being sensitive to shadowing, even if beamforming techniques enables gaining in flexibility of installation. In other words, if an obstacle is situated physically on the wireless communication path, the data transfer capacity is greatly reduced or even non-existent.

Since the source and receiver devices are already connected to an electrical network in order to be supplied with electrical energy, one approach may be to use the electrical network as a transmission channel. Technologies, such as for example the HomePlug specifications (registered trademark) published by the HomePlug Powerline Alliance Association, enables transferring data using the electrical network as the transmission channel. However, the theoretical bitrates allowed by such technologies based on an OFDM (Orthogonal Frequency Division Multiplex) modulation are around 500 Mbps on a transmission channel of the SISO (Single Input Single Output) type, or even 1 to 2 Gbps on a transmission channel of the MIMO (Multiple Input Multiple Output) type. However, in case of transporting non-compressed high-definition or even ultra-high definition video data, the bitrates may be as much as 3 to 18 Gbps with HDMI, in version 2.0 of the specifications. To transmit these data with the current transmission technologies for powerline communications, high compression is therefore necessary, which impairs the final quality of the video data presented to the user.

In addition, when the same audiovisual content must be transmitted to several receiver devices having different resolutions, the current transmission technologies for powerline communications require transmitting as many data streams as there are resolutions to be supported. This involves sharing the bandwidth on the electrical network, which amplifies the compression requirements and degrades even more the final quality of the video data presented to the user.

It is desirable to overcome these drawbacks of the prior art. It is in particular desirable to provide a solution that enables increasing the quality of experience QoE in the context of transmissions over the electrical network. It is also desirable to provide a solution that enables implementing such transmissions, although transmissions over the electrical network are on-going, for example according to the HomePlug technology, by limiting the disturbances caused against these on-going transmissions.

The invention relates to a method for transmitting video data over a powerline communications transmission channel, a first communication device obtaining video data in the form of a succession of non-compressed images, the first communication device determining the capacity of the powerline communications transmission channel. The method is such that the first communication device performs the following steps: wavelet-decomposition of each non-compressed image, the decomposition enabling obtaining data with different resolutions; compression of each wavelet-decomposed image, according to the determined capacity of the powerline communications transmission channel; transmission, in pulse form with spreading, of each compressed image toward a second communication device, so as to introduce data redundancy, the rate of which, for each data item in said compressed image, is defined according to the resolution of said video data, the redundancy of the data with the lowest resolution being greater than the one of the data of any other resolution. Thus, by virtue of the wavelet decomposition and the compression adapted to the capacity of the powerline communications transmission channel, in conjunction with the transmission in pulse form with spreading defined according to the resolution of the video data, the quality of experience QoE is improved. In addition, the transmission in pulse form with spreading allows the coexistence on the transmission channel of transmissions based on OFDM modulations, by limiting the disturbances caused against these transmissions. Finally, the wavelet decomposition optimizes the bandwidth consumption, when the video data correspond to a content that must be transmitted to several receiver devices having different resolutions.

According to a particular embodiment, the redundancy rate of the data of each compressed image is higher than the redundancy rate of the data, of said compressed image, having any other higher resolution. Thus, the lower the resolution in the wavelet decomposition, the higher the transmission robustness.

According to a particular embodiment, the first communication device performs the following step: division of the succession of non-compressed images into sequences of non-compressed images, by detection of changes in scenes on the basis of differences in luminance histograms between two consecutive images.

According to a particular embodiment, the first communication device performs the following steps: determination of speed maps representing the motion of the pixels of a non-compressed image to a following non-compressed image in the same sequence of non-compressed images; transmission of the obtained speed maps to the second communication device. Furthermore, the second communication device performs the following steps: reconstruction of non-compressed images from data received from the first communication device via the powerline communications transmission channel; obtaining a division into sequences of the reconstructed images; application of an image enhancement operation by inter-image interpolation for at least one sequence of reconstructed images, on the basis of said speed maps. Thus the quality of experience QoE is further improved.

According to a particular embodiment, the wavelet decomposition is a second-generation wavelet decomposition and, in the image enhancement operation for said sequence of reconstructed images, the second communication device applies a second-order time filter to the two-dimensional components of the wavelets. Thus the quality of experience QoE is further improved.

According to a particular embodiment, the first communication device performs the following steps: determination, for each pixel of each non-compressed image, of a first contrast value with respect to adjacent pixels; transmission of the determined first contrast values to the second communication device. Furthermore, the second communication device performs the following steps: determination, for each pixel of each reconstructed image, of a second contrast value with respect to adjacent pixels; comparison of the second contrast values with the first contrast values; deciding to apply or not the image enhancement operation, according to said comparison. Thus the use of processing resources by the second communication device is improved.

According to a particular embodiment, in order to determine the speed maps, the first communication device performs the following steps: determination of motion vectors for a first resolution level; and determination of search zones for applying a macroblock matching algorithm in a second resolution level of a higher order than said first resolution level, by applying a margin around the motion vectors determined for said first resolution level. Thus the determination of the speed maps has reduced complexity.

According to a particular embodiment, in order to determine the speed maps, the first communication device applies a sum of absolute differences algorithm to each sub-band of each resolution level, and determines a speed map, for each resolution level, from the results of the application of the sum of absolute differences algorithm to each sub-band of said resolution level. The quality of the images reconstructed by the second device is improved by taking into account all the sub-bands of said resolution level.

According to a particular embodiment, for each resolution level, weighting coefficients are applied to the results of the sum of absolute differences algorithm applied to each sub-band of said resolution level, said weighting coefficients being defined so as to minimise a residual distortion metric under a constraint of bitrate enabled by the capacity of the powerline communications transmission channel. Thus the best rate/distortion trade-off can be found.

According to a particular embodiment, when, in the speed maps, a motion vector is such that the minimum between the absolute values of the components of said motion vector is higher than a first predefined threshold, the first device considers that said motion vector is equal to a motion vector associated with a camera movement compensation. Thus the signalling of the speed maps can be reduced, by not taking into account any aberrations that could result from the sum of absolute differences algorithm.

According to a particular embodiment, when, in the speed maps, a motion vector is such that the sum of the absolute values of the components of said motion vector is below a second predefined threshold, the first device considers that said motion vector is equal to a motion vector associated with a camera movement compensation. Thus the signalling of the speed maps can be reduced.

According to a particular embodiment, the first device encodes the speed maps in a differential way with respect to the motion vector associated with the camera movement compensation. Thus the transmission channel resources necessary for sending the speed maps are reduced.

According to a particular embodiment, the wavelet decomposition and the compression performed by the first communication device are based on an encoding chain of the JPEG 2000 type.

According to a particular embodiment, the transmission in pulse form with spreading, performed by the first communication device is based on a transmission chain of the I-UWB type.

According to a particular embodiment, the transmission chain of the I-UWB type comprises an encoder of the LDPC type in order to reduce said data redundancy.

The invention also concerns a system for transmitting video data over a powerline communications transmission channel, said system comprising at least one first communication device comprising means for obtaining video data in the form of a succession of non-compressed images and means for determining the capacity of the powerline communications transmission channel. The system is such that the first communication device further comprises: means for performing a wavelet decomposition of each non-compressed image, enabling obtaining data with different resolutions; means for compressing each wavelet-decomposed image, according to the given capacity of the powerline communications transmission channel; means for transmitting, in pulse form with spreading, each compressed image, so as to introduce a data redundancy, the rate of which, for each data item of said compressed image, is defined according to the resolution of said video data, the redundancy of the data with the lowest resolution being greater than the one of the data of any other resolution.

The invention also relates to a computer program, which can be stored on a medium and/or downloaded from a communications network, in order to be read by a processor. This computer program comprises instructions for implementing any of the methods mentioned above, when said program is executed by the processor. The invention also relates to storage means comprising such a computer program.

Figure 1B:
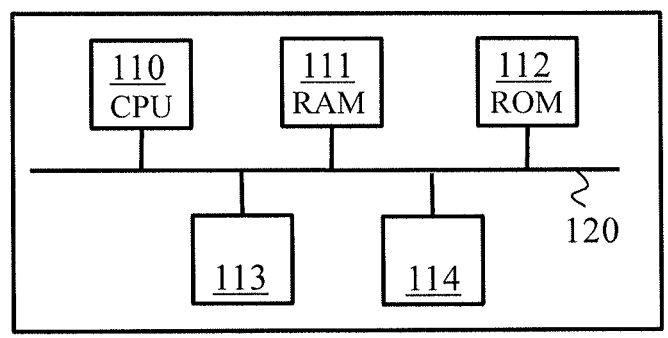
Figure 2:
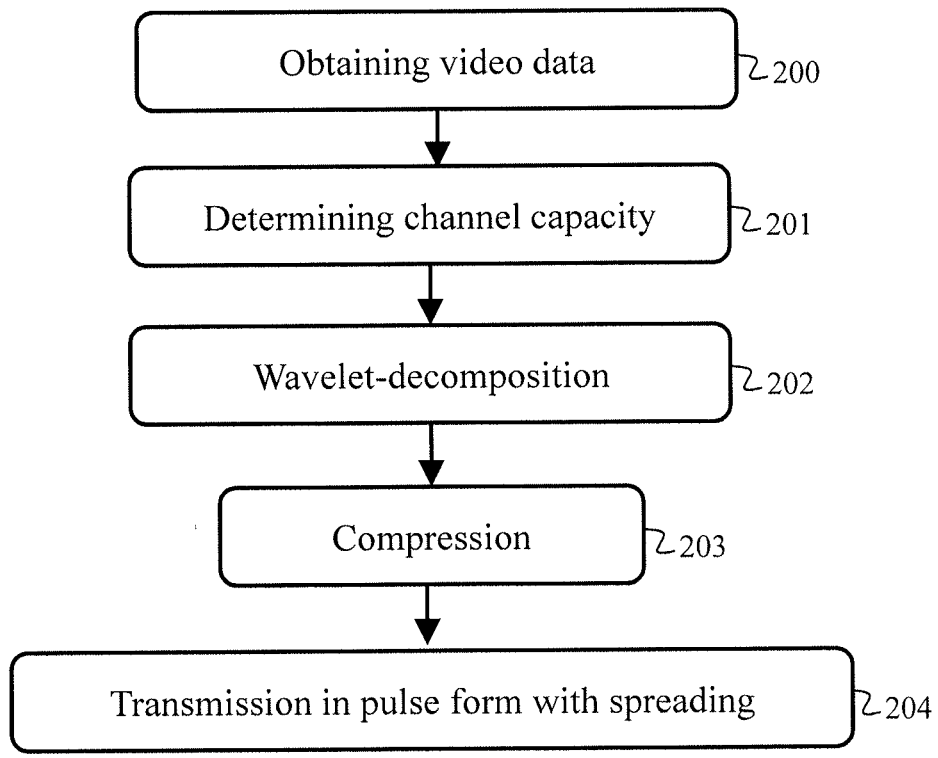
Figure 3:
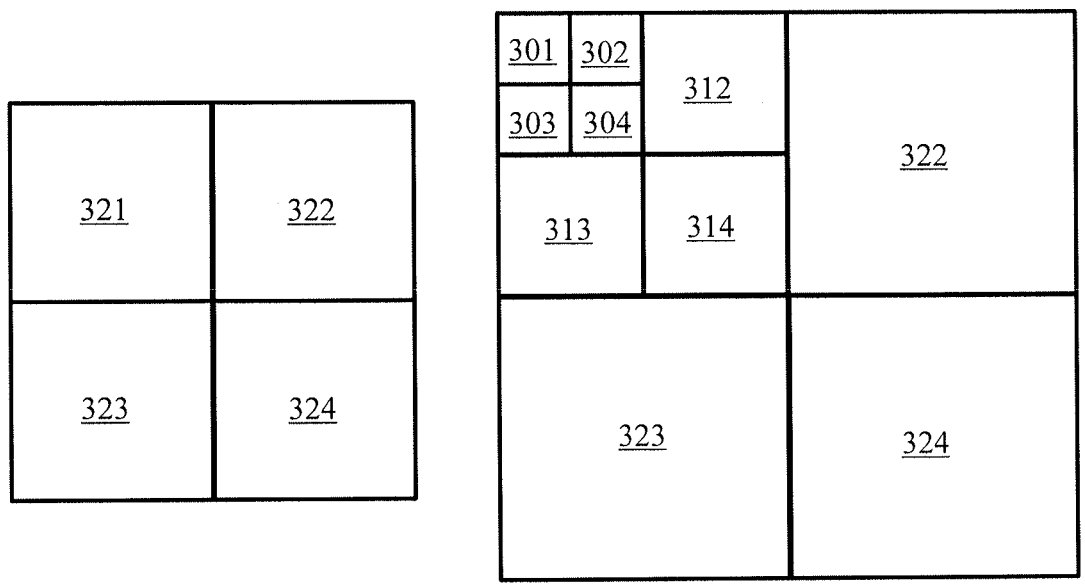
Figure 4A:
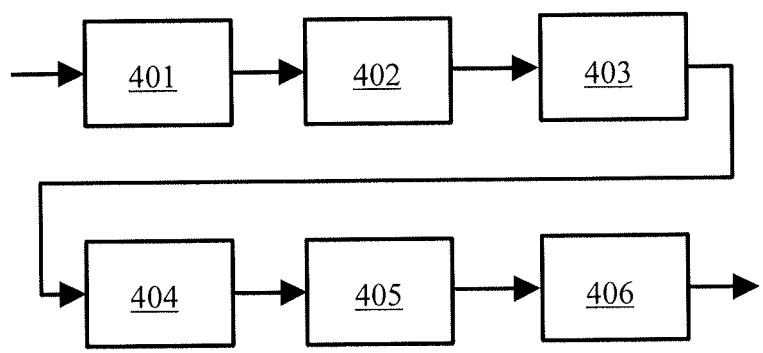
Figure 4B:
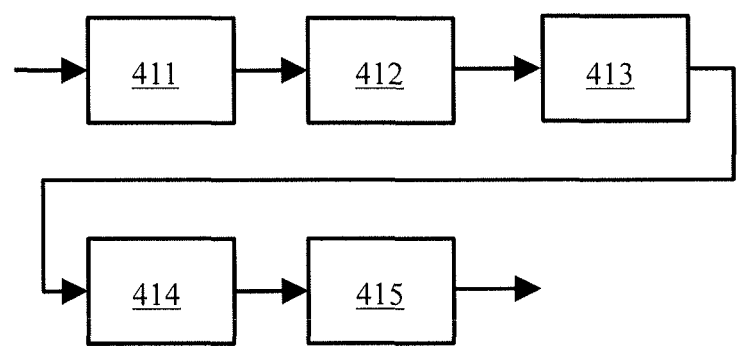
Figure 5A:
Figure 5B:
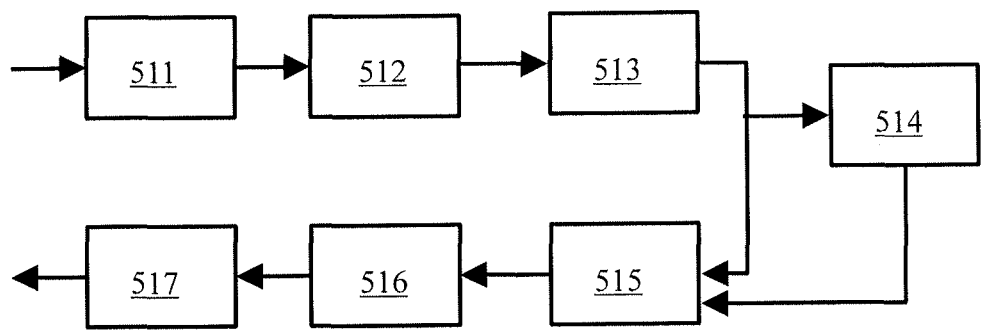
Figure 6:
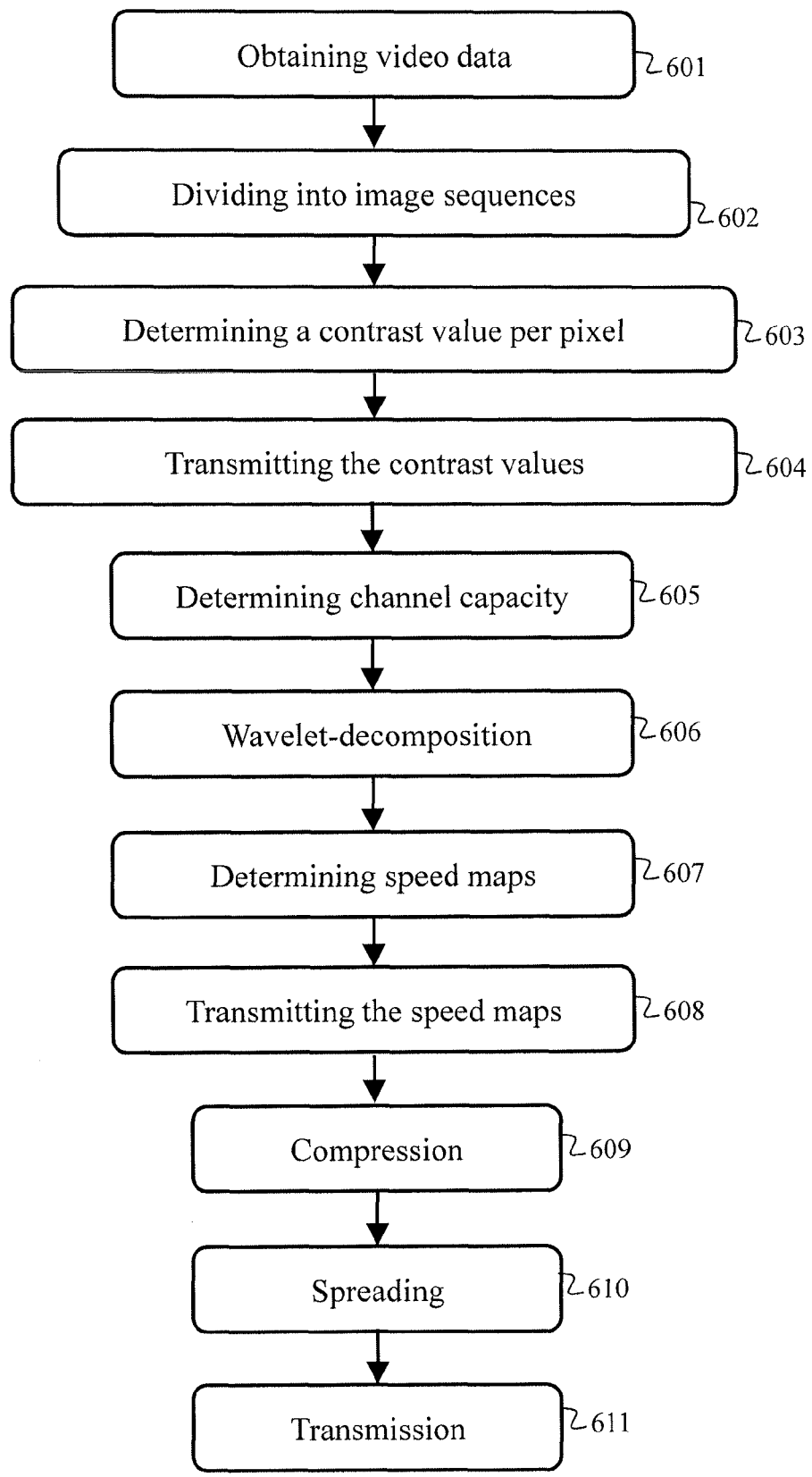
Figure 7:
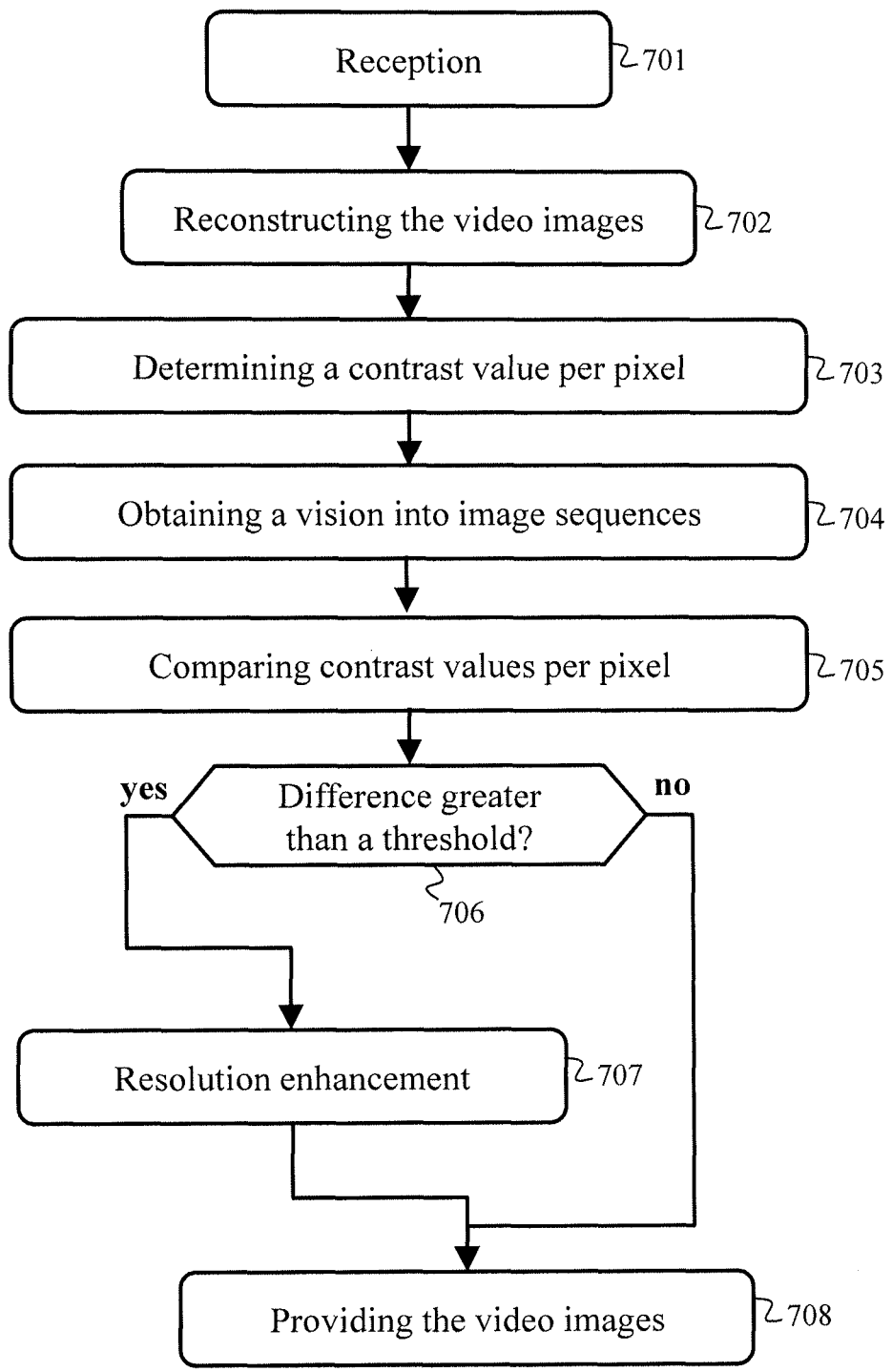

The features of the invention mentioned above, as well as others, will emerge more clearly from a reading of the following description of an example embodiment, said description being given in relation to the accompanying drawings, among which:

FIG. 1A schematically illustrates a system in which the invention may be implemented;

FIG. 1B schematically illustrates an example of a hardware architecture of a communication device of the system of FIG. 1;

FIG. 2 schematically illustrates a video data transmission algorithm according to the present invention;

FIG. 3 schematically illustrates a wavelet decomposition;

FIG. 4A schematically illustrates a JPEG 2000 encoding chain;

FIG. 4B schematically illustrates a JPEG 2000 decoding chain;

FIG. 5A schematically illustrates an I-UWB transmission chain;

FIG. 5B schematically illustrates an I-UWB reception chain;

FIG. 6 schematically illustrates a video data transmission algorithm based on the JPEG 2000 encoding chain and the I-UWB transmission chain;

FIG. 7 schematically illustrates a video data reception algorithm based on the JPEG 2000 decoding chain and the I-UWB reception chain.

FIG. 1A schematically illustrates a system in which the invention may be implemented. The system of FIG. 1A comprises a video data source device 101. The video data are supplied by the source device 101 in the form of a succession of non-compressed images. The system of FIG. 1A also comprises a video data receiver device 104, intended to receive the video data supplied by the source device 101.

To enable the receiver device 104 to receive the data supplied by the source device 101, the system of FIG. 1A further comprises two communication devices 102, 103 adapted for implementing powerline communications, as described below in relation to FIGS. 5A and 5B. A portion of an electrical line therefore separates the communication devices 102, 103 and provides a powerline communications transmission channel. The communication devices are also adapted for implementing a wavelet decomposition of the video data supplied by the source device 101, as described below in relation to FIGS. 3, 4A and 4B.

The source device 101 is connected to the communication device 102 via a link adapted for a transmission of data in the form of successions of non-compressed images. Likewise, the receiver device 104 is connected to the communication device 103 via a link adapted for a transmission of data in the form of successions of non-compressed images. For example, links of the HDMI type can be used. In a variant embodiment, the source device 101 and the communication device 102 on the one hand, and the receiver device 104 and the communication device 103 on the other hand, can be respectively implemented in a same housing, or even on a same printed circuit board, said links then being tracks of said printed circuit boards.

FIG. 1B schematically illustrates an example of hardware architecture of the communication devices 102, 103. Each communication device 102, 103 then comprises, connected by a communication bus 120: a processor or CPU (Central Processing Unit) 110; a random access memory (RAM) 111; a read only memory (ROM) 112; a storage unit or storage medium reader, such as an SD (Secure Digital) card reader 113; a first interface 114 for communicating with the source device 101 or the receiver device 104; and a second interface 115 for implementing the powerline communications.

The processor 110 is capable of executing instructions loaded in the RAM 111 from the ROM 112, an external memory (not shown), a storage medium or a communication network. When the communication device 102, 103 is powered up, the processor 110 is capable of reading instructions from the RAM 111 and executing them. These instructions form a computer program causing the implementation, by the processor 110, of all or some of the processing chains, algorithms and steps described below. All or some of the processing chains, algorithms and steps described below can be implemented in software form through the execution of a set of instructions by a programmable machine, such as a DSP (Digital Signal Processor) or a microcontroller, or be implemented in hardware form by a machine or a dedicated component, such as an FPGA (Field-Programmable Gate Array) or an ASIC (Application-Specific Integrated Circuit).

FIG. 2 schematically illustrates a video data transmission algorithm according to the present invention.

In a step 200, the communication device 102 obtains video data supplied by the source device 101 in the form of a succession of non-compressed images.

In a following step 201, the communication device 102 determines the capacity of the powerline communications transmission channel.

In a following step 202, the communication device 102 performs a wavelet decomposition of said images. The wavelet decomposition is described below in relation to FIG. 3. Proceeding with a wavelet decomposition enables obtaining data representing various resolution levels. Thus the same data stream corresponding to wavelet decomposed images can be transmitted to several receiver devices having different respective resolutions. Management of the transmission bandwidth is therefore improved. In addition, considering existing source devices, these typically proceed with a decompression of video data according the H.264 format, as is the case for example with BluRay (registered trademark) players or DVB-T (Digital Video Broadcasting—Terrestrial) decoders. Such a decompression causes a loss of quality by introducing artefacts. If the communication device 102 had used a compression according to the H.264 format, this would have resulted in amplifying these artefacts at the receiver device 104.

In a following step 203, the communication device 102 performs a compression of each wavelet-decomposed image according to the determined capacity of the powerline communications transmission channel.

In a following step 204, the communication device 102 performs a transmission in pulse form with spreading of each compressed image. The spreading applied is defined according to the level in the wavelet decomposition of each sub-band in question. To each sub-band corresponding to a resolution lower than the one of another sub-band is applied a more robust spreading than to said other sub-band. Thus the sub-bands with the lowest resolution benefit from the most robust spreading, which aims to ensure that the receiver device 104 can anyway display video data in the case of interference on the transmission channel, even if these video data are of lower quality than the resolution of the receiver device 104. This also aims to ensure that, when several receiver devices having different resolutions receive the video data stream, each of these devices can display video data. Furthermore, a transmission in pulse form with spreading, over a maximum distance of 10 meters, will be considered to be white noise by an OFDM demodulator.

An embodiment using a wavelet decomposition according to the JPEG 2000 standard, as defined in ISO/IEC 15444, and a transmission in pulse form over an ultra-wide band (UWB) is described below in relation to FIGS. 6 and 7.

FIG. 3 schematically illustrates a wavelet decomposition. The illustrative case is considered of a discrete three-level decomposition of an image into sub-bands, causing a generation of ten sub-bands.

The decomposition consists of filtering the signal of an image in two directions, in spatial sub-bands of low frequencies and of high frequencies. The filtering is applied by successive passes in order to decompose the signal of the image into sub-bands of several resolution levels (here three).

A first filtering is performed in a first direction (for example horizontal), by means of a band-pass filter or a combination of a band-pass filter and a high-pass filter. After passing through decimators by two, the resulting filtered signals are in their turn filtered in a second direction (for example vertical). Each resulting signal is once again passed through a decimator by two. Four sub-bands 321, 322, 323, 324 are then obtained and correspond to the highest resolution level in the decomposition. The result of this first decomposition pass is shown on the left-hand part of FIG. 3. The sub-band 321 comprises the low-frequency components in the two directions of the image signal. The sub-band 321 resulting from a wavelet-decomposition pass is denoted sub-band PB. The sub-band 322 comprises the low-frequency components in a first direction and the high-frequency components in a second direction of the image signal. The sub-band 322 resulting from a wavelet-decomposition pass is denoted sub-band V. The sub-band 323 comprises the high-frequency components in the first direction and the low-frequency components in the second direction. The sub-band 323 resulting from a wavelet decomposition pass is denoted sub-band H. Finally, the sub-band 324 comprises the high-frequency components in both directions. The sub-band 321 resulting from a wavelet-decomposition pass is denoted sub-band D.

A second pass is performed on the sub-band 321 in order to supply in the same way four sub-bands with an intermediate resolution level in the decomposition.

Finally, a third pass is performed on the sub-band comprising the low-frequency components in the two directions of the image signal of this intermediate resolution in order to supply in the same way four sub-bands with the lowest resolution level in the decomposition. The result of this first decomposition pass is shown on the right-hand part of FIG. 3. The sub-bands 312, 313, 314 result from the second pass and the sub-bands 301, 302, 303, 304 result from the third pass. The sub-band 301 therefore comprises the low-frequency components in the two directions of the image signal with the lowest resolution in the decomposition.

FIG. 4A schematically illustrates a JPEG 2000 encoding chain.

The video data, in the form of a succession of non-compressed images, are first of all injected into a preliminary processing unit 401. This preliminary processing may consist of transforming the values of the pixel of each non-compressed image into signed values. This preliminary processing may also consist of passing from an RGB colour space to a YUV colour space, which is more suited to data compression as the three components YUV are less correlated.

The processed video data are then injected into a wavelet-transform unit 402, the principle of which has been described above in relation to FIG. 3. Daubechies wavelets are preferentially used for their increased performance.

The video data resulting from the wavelet transform are then injected into a quantization unit 403 based on a dead-zone uniform scalar quantizer, the coefficient resulting from the wavelet transform that are below a predetermined threshold being set to zero.

The quantized video data are then injected into an entropic coding unit 404. The video data are then injected into a bitrate allocation unit 405 enabling the video data issuing from the entropic encoding to be put in the form of packets, each packet corresponding to a layer of a resolution level of a component of the image.

The video data in the form of packets are then injected into a frame organisation unit 406, scheduling the packets one after the other.

FIG. 4B schematically illustrates a JPEG 2000 decoding chain, which aims to perform the reverse operations to the JPEC 2000 encoding chain presented above in relation to FIG. 4A.

The video data in the form of packets, as generated by the frame organisation unit 406, are injected into a unit for decoding packet headers and for parsing the packets.

The video data extracted from the packets are then injected into an entropic decoding unit 412 performing the reverse operations to the entropic coding unit 404. The video data resulting from the entropic decoder are then injected into a reverse quantization unit 413 and then into a reverse wavelet transform unit 414 performing respectively the reverse operations to the quantisation unit 403 and to the wavelet transform unit 402.

The video data resulting from the reverse wavelet transform are then injected into a post-processing unit 415 performing the reverse operations to the preliminary processing unit 401.

FIG. 5A schematically illustrates an I-UWB (Impulse UWB) transmission chain implemented in the context of video data transmission.

The video data, ready to be transmitted, are injected into a channel coding unit 501 with spreading, introducing redundancy on the injected video data. The redundancy rate for each video data item is defined according to the decomposition level, i.e. the resolution, to which said video data item belongs. A higher redundancy rate is supplied to the video data with the lowest resolution.

The channel coding applied is preferentially of the LDPC (Low Density Parity Check) type, thus multiplying the video data via binary matrices, the redundancy introduced enabling detecting and correcting errors due to the powerline communications transmission channel affected by impulse noise. Using a channel coding of the LDPC type consumes little energy compared with other systems of FEC (Forward Error Correction) type, for example of the Viterbi or Reed-Solomon type.

The video data resulting from the channel coding are then injected into a bit interleaver 502, in order to improve uniformity of the distribution of the errors due to the powerline communications transmission channel.

The interleaved video data are then injected into a pulse modulation unit 503. Preferentially, the pulse modulation unit 503 implements a direct sequence spreading of the DS-UWB (Direct Sequence UWB) type. Reference can be made to the document "*Performance Evaluation and Comparison of Different Modulation Schemes for UWB Multi-access Systems*", Durisi and Benedetto, IEEE International Conference on Communications, May 2003, where the performances of various types of UWB modulation are evaluated and compared.

With each code word, representing an injected video data item, an electrical pulse form is associated. A 4 GHz carrier is preferentially used with a phase quadrature coding scheme QPSK (Quadrature Phase-Shift Keying).

The electrical pulses are then injected into a capacitive coupling unit 504 enabling these electrical pulses to be injected onto the electrical line portion between the communication devices 102, 103.

FIG. 5B schematically illustrates an I-UWB reception chain that aims to perform the reverse operations to the I-UWB transmission chain presented above in relation to FIG. 5A.

An electrical signal coming from the electrical line portion between the communication devices 102, 103 is obtained via a capacitive coupling unit 511, enabling eliminating therefrom the low-frequency components relating to the alternating supply signal passing over the electrical network.

The electrical signal obtained is then injected into a so-called AFE (Analog Front End) filter 512, enabling obtaining a filtered electrical signal corresponding to the powerline transmission. The filtered electrical signal is then injected into a sampling unit 513.

The samples obtained are then injected into a frame synchronisation and channel estimation unit 514 for performing a channel equalization via a digital matched filter 515 according to the form of the expected pulses. The set formed by the units 514, 515 enables performing the reverse operation to the pulse modulation unit 503.

The filtered samples are then injected into a bit de-interleaving unit 516, performing the reverse operation to the bit interleaving unit 502.

The de-interleaved samples are then injected into a channel decoding unit 517 performing the reverse operation to the channel coding unit 501.

FIG. 6 schematically illustrates a video data transmission algorithm based on the JPEG 2000 encoding chain presented in relation FIG. 4A and the I-UWB transmission chain presented in relation to FIG. 5A.

In a step 601, the communication device 102 obtains video data in the form of a succession of non-compressed images.

In a following step 602, the communication device 102 performs a division into image sequences. It is also said that the communication device 102 forms groups of pictures GOPs. This division into sequences is performed by detection of scene changes, based on a comparison of luminance histograms of consecutive images. Between two consecutive images, the communication device 102 determines a luminance histogram for each of said consecutive images. The communication device 102 then determines, for each luminance value, a difference in histogram between the consecutive images. The communication device 102 then determines a Euclidian norm of these luminance differences. If this Euclidian norm is above a predefined threshold S, then the communication device 102 considers that said consecutive images belong to the same group of pictures GOP; otherwise the communication device 102 considers that said consecutive images do not belong to the same group of pictures GOP. The use of the Euclidian norm masks variations in luminance related to movements within the same scene.

In a following step 603, the communication device 102 determines, for each pixel of each image, a contrast value C with respect to its adjoining pixels. For each image, the communication device 102 determines the average of the contrast values of the pixels constituting the image.

In a following step 604, the communication device 102 transmits the determined contrast value C to the communication device 103.

In a following step 605, the communication device 102 determines the capacity Cap of the powerline communications transmission channel as follows:

$$\mathrm{Cap} = \sum_i B_i \log_2\left(1 + \frac{S(f_i)}{N(f_i)}\right)$$

where $B_i$ represents a frequency bandwidth occupied by each carrier i of the I-UWB transmission, and where $$\frac{S(f_i)}{N(f_i)}$$

represents a signal to noise ratio of the transmission channel for a carrier frequency $f_i$. The information $$\frac{S(f_i)}{N(f_i)}$$

can be obtained by the communication device 102 by feedback from the communication device 103, following signal to noise ratio measurements made by the communication device 103.

The communication device 102 deduces therefrom a theoretical bitrate D that can used on the transmission channel by means of the Nyquist criterion, as follows:

$$D = \sum_i B_i \log_2(V_i)$$

where $V_i$ represents the valency, corresponding to information on the efficiency of the I-UWB modulation according to the signal to noise ratio $$\frac{S(f_i)}{N(f_i)}.$$

The communication device 102 may take a margin, for example of 3 dB, with respect to the theoretical rate D.

In a following step 606, the communication device 102 performs a wavelet-decomposition for each image, as described previously in relation to FIG. 3.

A second-generation wavelet decomposition can be implemented. This operation is referred to as lifting, and is similar to a spatial interpolation processing that takes place separably, meaning horizontally and then vertically, and which uses the filters related to the wavelets, and the fact that the image is decomposed into resolution levels in order to effect a second-order interpolation. In its basic principle, a lifting scheme applied to the 1D signal can be decomposed into three parts. First of all, a polyphase transformation is performed for separating the signal into two separate subsets formed respectively by samples with even indices and odd indices. Then, a prediction followed by an update operation are applied in order to generate a detail signal and an approximation signal. Generally, this 1D approach is extended to the 2D case, separably: at each resolution level, the lifting operation is applied to the rows and then to the columns, or vice versa, thus leading to one sub-band of approximation and three sub-bands of detail coefficients oriented horizontally, vertically and diagonally. Reference can be made to the work by Wim Sweldens described in the document "The Lifting Scheme: A Construction of Second Generation Wavelets", Society for Industrial and Applied Mathematics (SIAM), SIAM Journal on Mathematical Analysis, Volume 29 Issue 2, 1997, pages 511-546.

In a following step 607, the communication device 102 determines speed maps, on the basis of the groups of pictures GOPs determined at step 602. These speed maps represent the movement of the pixels from one image to a following image in the same sequence of images.

To do this, the communication device 102 takes the first image in a group of pictures GOP as a reference image (often referred to as "keyframe"). The communication device 102 then divides the reference image into squares, referred to as "macroblocks". The communication device 102 then performs a movement estimation within each of these macroblocks, by applying a block motion compensation principle. For each image following the reference image in the group of pictures GOP, the communication device 102 determines a block prediction represented by motion vectors, using a shifted images windows difference principle. All these motion vectors for each image following the reference image in the group of pictures GOP forms a speed map. A precision of less than one pixel can be obtained by interpolation so as to generate sub-pixel speed maps, refining the result of the shifted images windows difference by resolution of the optical stream equation. In other words, the communication device 102 performs an interpolation by considering that the light intensity of an image point, or its colour, is preserved during its motion from one image to another image in the group of pictures GOP.

In a variant embodiment, the communication device 102 takes the first image in a group of pictures GOP as a reference image and a following image. In order to obtain an estimation of the motion vectors applicable for various resolution levels, the communication device 102 obtains each of said images according to various resolution levels, these resolution levels being the same as those represented by wavelet decomposition, as described above in relation to FIG. 3. The communication device 102 can obtain these images according to various resolution levels by starting from said images and deleting pixels in said images in a substantially equally distributed manner. The communication device 102 then makes a comparative analysis of said images per resolution level. The communication device 102 then divides into squares, referred to as "macroblocks", the reference image in the lowest resolution level.

The communication device 102 then seeks, preferentially by means of a sum of absolute differences (SAD) algorithm, in the following image in the lowest resolution level and in the sub-band PB, a matching macroblock for each macroblock of the reference image. The communication device 102 thus determines motion vectors to reconstitute the following image from the reference image, for the lowest resolution level. A conventional approach would consist of applying the same process for each resolution level. It is advantageously proposed to reuse the motion vectors determined for the lowest resolution levels to determine the motion vectors for at least one higher resolution level. The communication device 102 then divides into macroblocks the reference image in a resolution level higher that the lowest resolution level. The communication device 102 then determines, for each macroblock, a restricted search zone in the following image, in the same resolution level and in the sub-band PB, from the motion vector determined for said macroblock in the lowest resolution level. The communication device 102 determines the restricted search zone by applying a margin around the motion vector applied from the position of said macroblock. Said margin is preferentially customizable and may be fixed by laboratory test or on site. Discovery of said matching macroblock is then obtained more quickly. The principle described above can be applied successively, starting from the lowest resolution level as far as the highest resolution level.

In another particular embodiment, the communication device 102 takes advantage of the wavelet-decomposed images in order to refine this speed map for each resolution level. Where proceeding with an application of an SAD algorithm on each low-frequency sub-band (e.g. sub-bands 301 and 321 in FIG. 3) is known for making a motion estimation in the context of wavelet decomposition of a sequence of video images, it is here proposed to apply the SAD algorithm to each sub-band of each resolution level and to determine a speed map for each resolution level from the results of applying the SAD algorithm to each sub-band of said resolution level. The quality of the images reconstructed by the communication device 103 is improved by virtue of taking account of all the sub-bands of said resolution level.

The communication device 102 then seeks, by means of the SAD algorithm, in the following image in the lowest resolution level and in the sub-band PB, a matching macroblock for each macroblock of the reference image in the same resolution level and with the same sub-band. For each macroblock of the following image in the lowest resolution level and in the sub-band PB, the communication device 102 then obtains a result SAD_PB1(i,j), where (i,j) re-represents the position of the macroblock in question. The communication device 102 does likewise for each other sub-band V, H and D in the lowest resolution level and then obtains respectively, for each macroblock in the following image in the lowest resolution level, results SAD_V1(i,j), SAD_H1(i,j) and SAD_D1(i,j). The communication device 102 then calculates a final result for each macroblock position in the following image in the lowest resolution level, such that:

$$SAD1(i,j)=SAD\_PB1(i,j)+\alpha*SAD\_V1(i,j)+\beta*SAD\_H1(i,j)+\gamma*SAD\_D1(i,j)$$

where $\alpha$, $\beta$ and $\gamma$ are weighting coefficients greater than 0 and less than 1.

In other words, the communication device 102 determines a value for each macroblock position in the following image in the lowest resolution level, from the result of the SAD algorithm applied to the sub-band PB to which a weighting of the results of the SAD algorithm applied to the sub-bands V, H and D is added. The communication device 102 does the same for each resolution, thus starting from the lowest resolution level as far as the highest resolution level. In order to determine a restricted search zone, the communication device 102 may apply the mechanism described above. Considering by way of illustration that the wavelet decomposition leads to three resolution levels, the communication device 102 determines the following values, the same weighting coefficients being applied to each resolution level:

$$SAD1(i,j)=SAD\_PB1(i,j)+\alpha*SAD\_V1(i,j)+\beta*SAD\_H1(i,j)+\gamma*SAD\_D1(i,j)$$

$$SAD2(i,j)=SAD\_PB2(i,j)+\alpha*SAD\_V2(i,j)+1\beta*SAD\_H2(i,j)+\gamma*SAD\_D2(i,j)$$

$$SAD3(i,j)=SAD\_PB3(i,j)+\alpha*SAD\_V3(i,j)+\beta*SAD\_H3(i,j)+\gamma*SAD\_D3(i,j)$$

where the results SAD_V2(i,j), SAD_H2(i,j) and SAD_D2(i,j) are obtained for the intermediate resolution level and SAD_V3(i,j), SAD_H3(i,j) and SAD_D3(i j) are obtained for the highest resolution level.

The communication device 102 then seeks, for each macroblock of the reference image and for each resolution Z (Z=1 or 2 or 3 in the above example), the macroblock position (i,j) in the following image that minimises the concerned value SAD'Z' ('Z'=1 or 2 or 3 in the example above). This gives, for each resolution and for each macroblock of the reference image, a motion vector for reaching the position (i,j) obtained by means of the SAD algorithm applied to said resolution level. The difference between the position (i,j) thus obtained for said resolution level and the position of the corresponding macroblock in the reference image is thus a motion vector of components Vx and Vy.

The speed maps, i.e. the motion vectors contained in the speed maps, may then be encoded by means of a differential encoding with respect to a camera motion compensation, denoted CC. The camera motion compensation CC corresponds to the motion vector, in the reference image at the lowest resolution level, that corresponds to the kept result of the SAD algorithm which is the lowest among the kept results of the SAD algorithm for all the macroblocks of said resolution level.

The values obtained for the components Vx and Vy may lead to aberrations, which are preferentially taken into account in the following manner. If the components Vx and Vy of a motion vector are such that the minimum between the absolute value of the component Vx and the absolute value of the component Vy is above a predefined threshold S1, then the communication device 102 considers that an aberration is present and considers that said motion vector is equal to the motion vector associated with the camera motion compensation CC. The predefined threshold S1 may be fixed by laboratory tests or on site. The communication device 102 may then simplify the signalling associated with this motion vector ("SKIP" mode) when the speed maps are encoded by means of a differential encoding with respect to the camera motion compensation CC, which reduces the bandwidth consumption for transmitting these data, since this differential encoding then leads to a null value. The value of the predefined threshold S1 may be adapted according to the camera motion compensation CC if the speed maps are not encoded by means of such a differential encoding.

So as to further reduce the bandwidth consumption for transmitting these data, the communication device 102 may consider that a motion vector is null when the components Vx and Vy of said motion vector after differential encoding with respect to the camera motion compensation CC are such that the sum of the absolute value of the component Vx and the absolute value of the component is less than a predefined threshold S2, meaning in this case that the communication device 102 considers that said motion vector is equal to the motion vector associated with the camera motion compensation CC. The value of the predefined threshold S2 depends on the resolution level to which the macroblock to which said motion vector applies belongs. The predefined threshold S2 may be fixed by laboratory tests or on site. The communication device 102 may then also simplify the signalling associated with this motion vector ("SKIP" mode). The value of the predefined threshold S2 may be adapted according to the camera motion compensation CC if the speed maps are not encoded by means of such a differential encoding.

The weighting coefficients α, β and γ may be defined by laboratory tests or on site, according to a trade-off between residual distortion after reconstruction of the images by the communication device 103 and actual bitrate on the electrical line portion that separates the communication devices 102 and 103. In order to obtain a residual distortion metric, the following method may be applied. First of all, a local residual distortion may be determined for each window in a set of windows covering all the reconstructed image by subtracting each of the pixel values in said reconstructed image from each of the values of the same pixels in the original image. The residual distortion metric can then be obtained by adding the sum of the local residual distortions thus determined. The weighting coefficients α, β and γ may then be defined so as to minimise the residual distortion metric under a bitrate constraint enabled by the capacity of the powerline communications transmission channel.

In a following step 608, the communication device 102 transmits each determined speed map to the communication device 103. Each speed map may also be transmitted conjointly with the video data in a subsequent step 610 described below.

In a following step 609, the communication device 102 compresses the video data, according to the determined channel capacity, so that the volume of the compressed video data after spreading is adapted to the determined theoretical bitrate D. This compression is performed by adjustment of the quantization operation.

In a following step 610, the communication device 102 proceeds with a spreading of the compressed video data so as to introduce data redundancy, the rate of which, for each video data item, is defined according to the decomposition level, i.e. the resolution, to which said video data item belongs. The robustness of the spreading applied to the compressed video data corresponding to the lowest resolution is greater than the robustness of the spreading applied to the compressed video data corresponding to any other resolution. A linear LDPC code of the type (8,4) is for example used for encoding the compressed video data with the lowest resolution, meaning a code generating 8-bit data sets from 4-bit data sets, and a linear LDPC code of the type (2,1) for encoding the compressed video data with the lowest resolution, meaning a code generating 2-bit data sets from 1-bit data. In a particular embodiment, the robustness of the spreading applied to the compressed video data corresponding to each resolution is greater than the robustness of the spreading applied to the compressed video data corresponding to any other higher resolution.

In a following step 611, the communication device 102 transmits the video data after spreading via the transmission channel, to the communication device 103.

FIG. 7 schematically illustrates a video data reception algorithm, based on the JPEG 2000 decoding chain presented in relation to FIG. 4B and the I-UWB reception chain presented in relation to FIG. 5B.

In a step 701, the communication device 103 receives data via the transmission channel, coming from the communication device 102. The video data received correspond to speed maps, to contrast values and to compressed video data.

In a following step 702, the communication device 103 reconstructs images from the compressed video data received at the step 701. The communication device 103 applies first of all the I-UWB reception chain already described in relation to FIG. 5B, and then the JPEG 2000 decoding chain already described in relation to FIG. 4B. In other words, the communication device 103 performs the operation that is the reverse of the spreading operation performed by the communication device 102 at the step 610, and then the reverse operation to the wavelet decomposition operation performed by the communication device 102 at the step 608.

In a following step 703, the communication device 103 performs the same operation as the one performed by the communication device 102 at the step 603, but using reconstructed images. The communication device 103 therefore obtains, for each reconstructed image, a contrast value C'. This contrast value C' enables evaluating the distortion incurred by the images following the compression and powerline communications transmission operation.

In a following step 704, the communication device 103 obtains a division into image sequences, meaning groups of pictures GOPs. Either the communication device 103 performs the same operation as the one performed by the communication device 102 at the step 602, but using reconstructed images, or the communication device 102 communicates to the communication device 103 information relating to the division into image sequences performed at the step 602.

In a following step 705, the communication device 103 compares, for each image, the contrast value C' with the contrast value C received for said image at the step 701. The communication device 103 then determines a difference between the contrast value C' and the contrast value C.

In a following step 706, the communication device 103 checks whether the maximum difference, in absolute value, between the contrast value C' and the contrast value C of the reconstructed images for the same image sequence is above a predefined threshold. Alternatively, the communication device 103 could check whether an average difference in absolute value between the contrast value C' and the contrast value C of the reconstructed image for the same image sequence is above a predefined threshold. In other words, the communication device 103 checks whether the distortion incurred by the images following the compression and powerline communications transmission operation is above a predefined threshold. If the checked difference is above the predefined threshold, a step 707 is performed; otherwise a step 708 is performed.

In the step 707, the communication device 103 implements an operation of resolution enhancement by inter-image interpolation for the concerned sequence of images, on the basis of the speed maps generated by the communication device 102 at the step 605 and received by the communication device 103 at the step 701. Since the speed maps represent the motion of each image point between two consecutive images in the same group of pictures GOP, said speed maps, by definition, enable the communication device 103 to refine an image in a given resolution from this same image in a lower resolution and the previous image in said given resolution, as indicated by the optical stream equation. A second-order interpolation of the Taylor development may be implemented to do so.

The communication device 103 may also apply, to the sequence of images in question, a second-order temporal filtering on the two-dimensional components of motion-compensated wavelets for which a lifting mechanism was applied at the step 608, and then the step 708 is performed. This second-order filtering improves the visual quality of a noisy video.

This second-order temporal filtering applied to the images is performed in accordance with the following formulae:

$$h_k[m] = x_{2k+1}[m] - \frac{1}{2}(x_{2k}[m + v_{2k+1 \to 2k}(m)] + x_{2k+2}[m + v_{2k+1 \to 2k+2}(m)])$$

$$l_k[m] = x_{2k}[m]$$

where $x_k$ designates the image of the group of pictures GOP at an instant k, where $x_i[m+v_{i+j \to i}(m)]$ represents the motion-compensated image of $x_i$, and where $h_k$ and $l_k$ represent respectively the high-pass and low-pass filters of the second-order temporal filtering.

In the step 708, the communication device 103 supplies to the receiving device 104 the video data issuing from the reconstruction operation performed at the step 702, optionally modified by the resolution enhancement operation performed at the step 707.

The invention claimed is:

1. A transmission method for transmitting video data over a powerline communications transmission channel, a first communication device obtaining video data in the form of a succession of uncompressed images, the first communication device performing:
    performing a wavelet-decomposition of each uncompressed image, the wavelet-decomposition enabling obtaining data with different resolutions;
    performing a compression of each wavelet-decomposed image;
    transmitting, in pulse form with spreading, of each compressed image to a second communication device, so as to introduce data redundancy, the rate of which, for each data item in said compressed image, is defined according to the resolution of said video data item, the redundancy of the data with the lowest resolution being greater than the one of the data of any other resolution;
    dividing the succession of uncompressed images into uncompressed image sequences, by detecting changes in scenes on the basis of differences in luminance histograms between two consecutive images;
    determining speed maps representing the motion of the pixels of an uncompressed image to a following uncompressed image in the same sequence of uncompressed images;
    transmitting the obtained speed maps to the second communication device to enable said second communication device to apply an image enhancement operation by inter-image interpolation for at least one sequence of reconstructed images, on the basis of said speed maps; and
    determining the capacity of the powerline communications transmission channel and implementation of the compression of each wavelet-decomposed image, according to the determined capacity of the powerline communications transmission channel;
and wherein, for determining the speed maps, the first communication device applies a sum of absolute differences algorithm to each sub-band of each resolution level, and determines a speed map, for each resolution level, from the results of applying the sum of absolute differences algorithm to each sub-band of said resolution level.

2. The transmission method according to claim 1, wherein the redundancy rate of the data of each compressed image is greater than the redundancy rate of the data, in said compressed image, with any other higher resolution.

3. The transmission method according to claim 1, wherein the second communication device performs:
    reconstructing uncompressed images from data received from the first communication device via the powerline communications transmission channel;
    obtaining a division of the reconstructed images into sequences;
    applying the image-enhancement operation by inter-image interpolation for at least one sequence of reconstructed images, on the basis of said speed maps.

4. The transmission method according to claim 3, wherein the wavelet-decomposition is a second-generation wavelet decomposition and, in the image-enhancement operation for said sequence of reconstructed images, the second communication device applies a second-order temporal filtering to the two-dimensional components of the wavelets.

5. The transmission method according to claim 3, wherein the first communication device:
    determines for each pixel of each uncompressed image a first contrast value with respect to adjacent pixels; and
    transmits to the second communication device the determined first contrast values; and
wherein the second communication device performs:
    determining for each pixel of each reconstructed image a second contrast value with respect to adjacent pixels;
    performing a comparison of the second contrast values with the first contrast values; and
    deciding to apply or not the image enhancement operation, according to said comparison.

6. The transmission method according to claim 1, wherein, for determining the speed maps, the first communication device performs:

determining motion vectors for a first resolution level; and
determining search zones for applying a macroblock matching algorithm in a second resolution level of a higher order than said first resolution level, by applying a margin around the motion vectors determined for said first resolution level.

7. The transmission method according to claim 1, wherein, for each resolution level, weighting coefficients are applied to the results of the sum of absolute differences algorithm applied to each sub-band of said resolution level, said weighting coefficients being defined so as to minimise a residual distortion metric under a bitrate constraint enabled by the capacity of the powerline communications transmission channel.

8. The transmission method according to claim 1, wherein, when, in the speed maps, a motion vector is such that the minimum between the absolute values of the components of said motion vector is higher than a first predefined threshold, the first communication device considers that said motion vector is equal to a motion vector associated with a camera motion compensation.

9. The transmission method according to claim 8, wherein the first communication device encodes the speed maps differentially with respect to the motion vector associated with the camera motion compensation.

10. The transmission method according to claim 1, wherein, when, in the speed maps, a motion vector is such that the sum of the absolute values of the components of said motion vector is lower than a second predefined threshold, the first communication device considers that said motion vector is equal to a motion vector associated with a camera motion compensation.

11. The transmission method according to claim 1, wherein the wavelet-decomposition and the compression performed by the first communication device are based on an encoding chain of the JPEG 2000 type.

12. The transmission method according to claim 1, wherein the transmission, in pulse form with spreading, performed by the first communication device is based on a transmission chain of the I-UWB type.

13. The transmission method according to claim 12, wherein the I-UWB transmission chain comprises an encoder of the LDPC type in order to introduce said data redundancy.

14. A system for transmitting video data over a powerline communications transmission channel, said system comprising at least one first communication device configured to:

obtain video data in the form of a succession of uncompressed images;
performing a wavelet-decomposition of each uncompressed image, enabling obtaining data with different resolutions;
compressing each wavelet-decomposed image;
transmitting, in pulse form with spreading, each compressed image, so as to introduce a data redundancy, the rate of which, for each data item in said compressed image, is defined according to the resolution of said video data item, the redundancy of the data with the lowest resolution being higher than the one of the data with any other resolution;
dividing the succession of uncompressed images into uncompressed image sequences, by detecting changes in scenes on the basis of differences in luminance histograms between two consecutive images;
determining speed maps representing the motion of the pixels of an uncompressed image to a following uncompressed image in the same sequence of uncompressed images;
transmitting the obtained speed maps to the second communication device to enable said second communication device to apply an image enhancement operation by inter-image interpolation for at least one sequence of reconstructed images, on the basis of said speed maps; and
determining the capacity of the powerline communications transmission channel and implementing the compression of each wavelet-decomposed image, according to the determined capacity of the powerline communications transmission channel,
wherein, for determining the speed maps, the first communication device is configured to apply a sum of absolute differences algorithm to each sub-band of each resolution level, and for determining a speed map, for each resolution level, from the results of applying the sum of absolute differences algorithm to each sub-band of said resolution level.

15. A non-transitory information storage medium storing computer program instructions causing implementation of claim 1, when said computer program instructions are executed by a processor.

* * * * *